(12) United States Patent
Murakami et al.

(10) Patent No.: US 8,886,106 B2
(45) Date of Patent: Nov. 11, 2014

(54) INTERMEDIATE TRANSFER BELT AND METHOD FOR PRODUCING THE SAME

(75) Inventors: Miyuki Murakami, Kanagawa (JP); Susumu Sudo, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 132 days.

(21) Appl. No.: 13/404,210

(22) Filed: Feb. 24, 2012

(65) Prior Publication Data

US 2012/0225376 A1 Sep. 6, 2012

(30) Foreign Application Priority Data

Mar. 2, 2011 (JP) ................................. 2011-044701

(51) Int. Cl.
- G03G 15/20 (2006.01)
- C08G 73/10 (2006.01)
- G03G 15/16 (2006.01)
- C08L 79/08 (2006.01)

(52) U.S. Cl.
CPC ............. *G03G 15/161* (2013.01); *C08G 73/10* (2013.01); *C03G 15/162* (2013.01); *C08L 79/08* (2013.01)
USPC ........... 399/333; 399/302; 399/303; 399/308; 399/312; 399/313; 430/74; 528/170; 528/310; 528/322

(58) Field of Classification Search
USPC ............ 430/74; 399/302, 303, 308, 312, 313, 399/399; 528/170, 310, 322
See application file for complete search history.

(56) References Cited

U.S. PATENT DOCUMENTS

| | | | | |
|---|---|---|---|---|
| 5,665,802 | A * | 9/1997 | Maki et al. | 524/141 |
| 2003/0040578 | A1* | 2/2003 | Sugo et al. | 525/100 |
| 2005/0202337 | A1 | 9/2005 | Miyoshi et al. | |
| 2006/0199920 | A1 | 9/2006 | Okada et al. | |
| 2008/0230261 | A1* | 9/2008 | Tanaka et al. | 174/258 |
| 2009/0236566 | A1 | 9/2009 | Nishiura et al. | |

FOREIGN PATENT DOCUMENTS

| | | |
|---|---|---|
| CN | 1656427 | 8/2005 |
| CN | 101213495 | 7/2008 |
| CN | 101517000 | 8/2009 |
| JP | 63-311263 | 12/1988 |
| JP | 2003-082231 | * 3/2003 |
| JP | 2003-277502 | 10/2003 |
| JP | 2004155911 | 6/2004 |
| JP | 2005-247988 | 9/2005 |
| TW | 200927833 | 7/2009 |

* cited by examiner

Primary Examiner — Gregory Listvoyb
(74) Attorney, Agent, or Firm — Lucas & Mercanti, LLP

(57) ABSTRACT

An object is to provide an intermediate transfer belt and a method for producing the same which inhibits fine toner dots in white area in an environment of low temperature and low humidity and further, inhibits roughness of image with long-term use. An intermediate transfer belt for an electrophotographic image forming apparatus comprising a polyimide having a dispersed conductive filler, wherein the polyimide contains a unit structure represented by Formula (1);

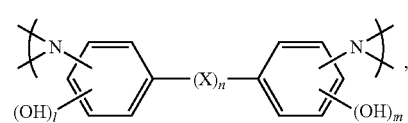

Formula (1)

wherein X represents a group selected from Formulas (a) to (e), n, m, l each represents 0 or 1, and at least one of m and l is 1,

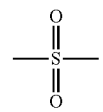

Formula (a)

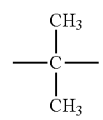

Formula (b)

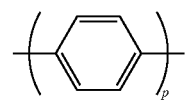

Formula (c)

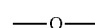

Formula (d)

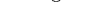

Formula (e)

wherein p in Formula (c) and q in Formula (e) each is an integer of 1 to 5.

5 Claims, 1 Drawing Sheet

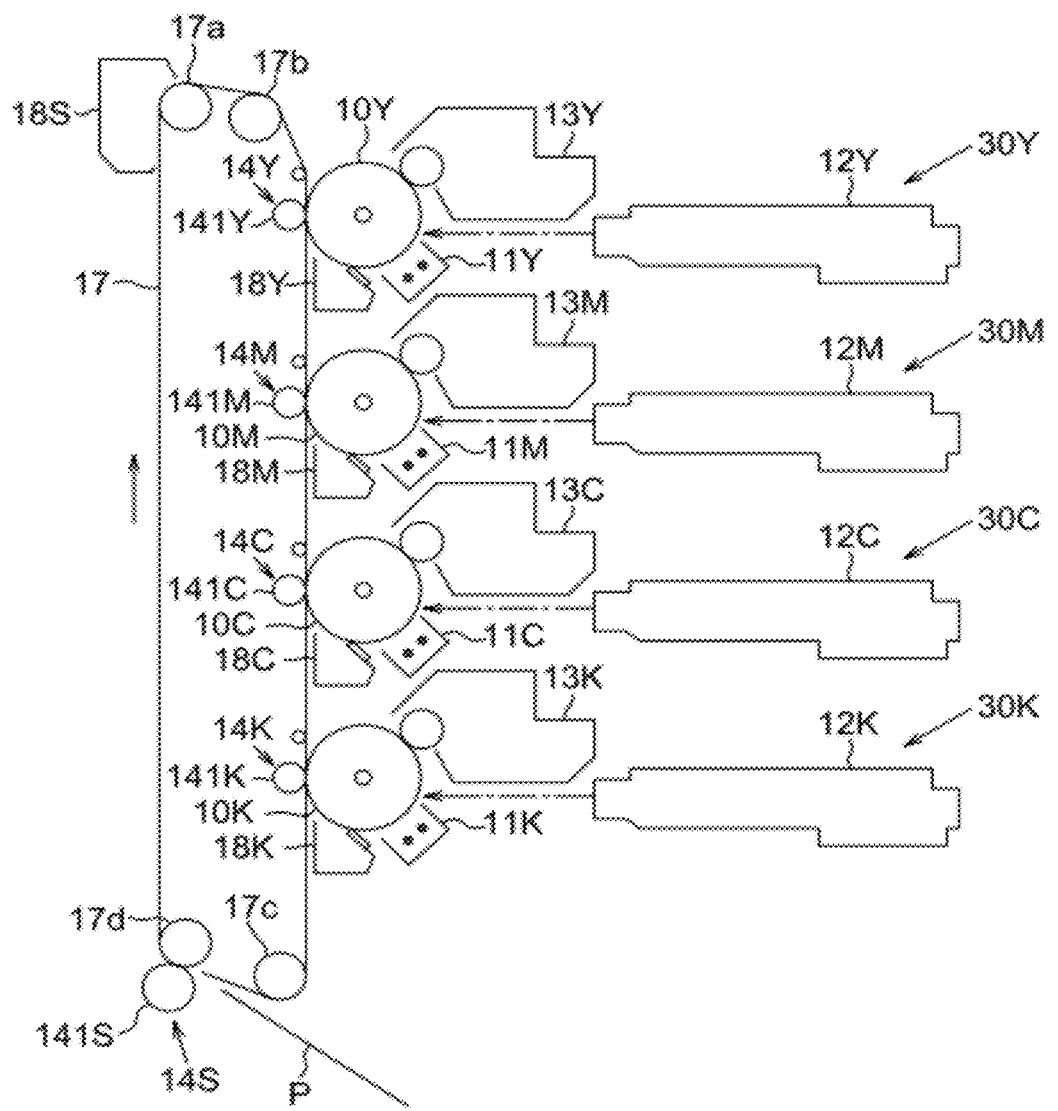

INTERMEDIATE TRANSFER BELT AND METHOD FOR PRODUCING THE SAME

This application is based on Japanese Patent Application No. 2011-044701 filed on Mar. 2, 2011, which is incorporated hereinto by reference.

TECHNICAL FIELD

The present invention is related to an intermediate transfer belt for an electrophotographic image forming apparatus and a method for producing the same.

BACKGROUND OF THE INVENTION

Heretofore, in an image forming apparatus which forms an image by an electrophotographic image forming method, so as to enhance a life of an apparatus, instead of a direct transfer method in which a toner image formed on an electrostatic latent image carrier such as a photoreceptor drum is directly transferred to an image support, investigated is an intermediate transfer method in which a toner image formed on an electrostatic latent image carrier is once transferred to an intermediate transfer belt (primary transfer), thereafter the toner image is transferred to the image support (secondary transfer) and fixed. Further, in view of downsizing, investigated is a method in which an intermediate transfer belt doubles as a function of conveying an image support.

Semi conductive belt is employed to the intermediate transfer belt. Specifically, for example, proposed is an intermediate transfer belt in which carbon black such as furnace black and acetylene black as conductive filler is dispersed in polyimide (Patent Documents 1-3).

However, in an environment of low temperature and low humidity, fine toner dots in white area may occur by an image forming apparatus using these intermediate transfer belts. Further, roughness of image may occur with long-term use.

PRIOR ART DOCUMENT

Patent Document

Patent Document 1: Unexamined Japanese Patent Application (hereinafter, refers to as JF-A) No. 63-311263

Patent Document 2: JP-A No. 2003-277502

Patent Document 3: JP-A No. 2005-247988

SUMMARY OF THE INVENTION

In view of the foregoing, the present invention was achieved. An object of the present invention is to provide an intermediate transfer belt and a method for producing the same which can inhibit fine toner dots in white area in an environment of low temperature and low humidity and further, can inhibit roughness of image with long-term use.

An intermediate transfer belt for an electrophotographic image forming apparatus comprising a polyimide having a dispersed conductive filler, wherein the polyimide contains a unit structure represented by Formula (1);

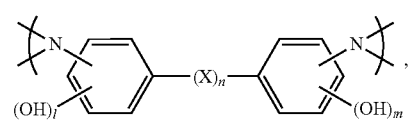

Formula (1)

wherein X represents a group selected from Formulas (a) to (e), n, m, l each represents 0 or 1, and at least one of m and l is 1,

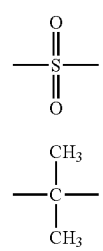

Formula (a)

Formula (b)

Formula (c)

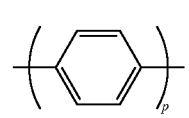

Formula (d)

Formula (e)

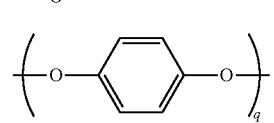

wherein p in Formula (c) and q in Formula (e) each is an integer of 1 to 5.

The intermediate transfer belt of the present invention is characterized by comprising the polyamic acid made of a tetracarboxylic acid, a diamine having a hydroxyl group represented by Formula (2) and an aromatic diamine without having hydroxyl group,

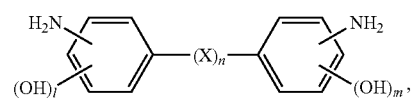

Formula (2)

wherein X represents a group selected from Formulas (a) to (e), n, m, l each represents 0 or 1, and at least one of m and l is 1,

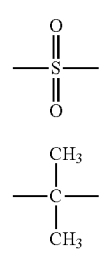

Formula (a)

Formula (b)

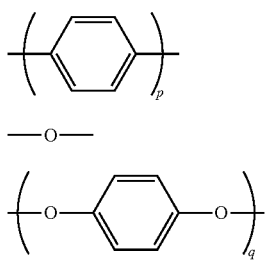

wherein p in Formula (c) and q in Formula (e) each is an integer of 1 to 5; and wherein the tetracarboxylic acid is incorporated in the range of 0.85 to 1.2 mol based on 1.00 mol of sum of the diamine having a hydroxyl group represented by Formula (2) and the aromatic diamine without having hydroxyl group; and further a mol ratio of the diamine having hydroxyl group to the aromatic diamine without having hydroxyl group in the total diamine is in the range of from 0.10:0.90 to 1.00:0.00.

Further, a method for producing the intermediate transfer belt of the present invention is characterized by comprising steps of:

synthesizing a polyamic acid by using at least a tetracarboxylic acid and a diamine having a hydroxyl group represented by Formula (2), forming a belt shaped precursor of the polyamic acid and converting the polyamic acid to the polyimide;

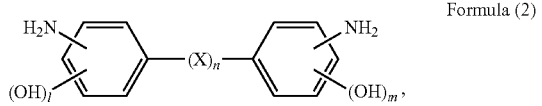

Formula (2)

wherein X represents a group selected from Formulas (a) to (e), n, m, l each represents 0 or 1, and at least one of m and l is 1,

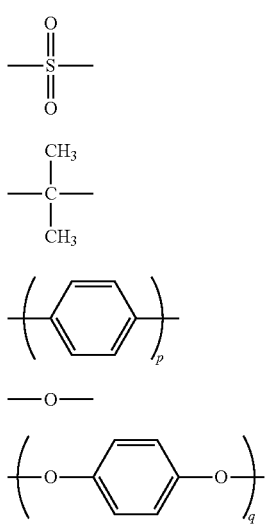

Formula (a)

Formula (b)

Formula (c)

Formula (d)

Formula (e)

wherein p in Formula (c) and q in Formula (e) each is an integer of 1 to 5.

The method for producing the intermediate transfer belt of the present invention, wherein the polyamic acid is synthesized by using the tetracarboxylic acid, the diamine having a hydroxyl group represented by Formula (2), and an aromatic diamine without having hydroxyl group and the tetracarboxylic acid is incorporated in the range of 0.85 to 1.2 mol based on 1.00 mol of sum of the diamine having a hydroxyl group represented by Formula (2), and the aromatic diamine without having hydroxyl group; and further a mol ratio of the diamine having hydroxyl group to the aromatic diamine without having hydroxyl group in the total diamine is in the range of from 0.10:0.90 to 1.00:0.00.

According to the intermediate transfer belt of the present invention, since the intermediate transfer belt comprises polyimide having hydroxyl group and can keep a surface resistivity in the predetermined range with long-term use by lowering a residual charge and by inhibiting a change of the surface resistivity by applying voltage, whereby fine toner dots in white area can be inhibited in an environment of low temperature and low humidity and further inhibited roughness of image with long-term use.

According to the method for producing the intermediate transfer belt of the present invention, a polyamic acid having hydroxyl group can be obtained by using a diamine having hydroxyl group. By adding a conductive filler into the polyamic acid having hydroxyl group and further imidizing reaction, an intermediate transfer belt can be obtained in a state of having highly dispersed conductive filler in the polyimide. As a result, the intermediate transfer belt can be prepared which can keep a surface resistivity in the predetermined range with long-term use.

FIG. 1 shows an explanatory schematic diagram of the image forming apparatus embodied in the present invention.

DETAILED DESCRIPTION OF THE INVENTION

The present invention will now be further detailed.

[Intermediate Transfer Belt]

The intermediate transfer belt of the present invention is an intermediate transfer belt for electrophotographic image forming apparatus and a semiconductive belt in which conductive filler is dispersed in polyimide described later.

The intermediate transfer belt of the present invention has a shape of an endless belt and may be made of polyimide itself having dispersed conductive filler or two layer structure which has a substrate made of the polyimide formed from the polyamic acid and outside of the substrate provided is covered with a fluorine layer of 5-50 μm as a toner filming prevention layer.

The intermediate transfer belt of the present invention preferably has a surface resistivity of $1 \times 10^{10}$ to $1 \times 10^{13} \Omega/\square$.

In the case of the surface resistivity being less than $1 \times 10^{10} \Omega/\square$, it may cause fine toner dots in white area in an obtained visible image. In the case of the surface resistivity exceeding $1 \times 10^{13} \Omega/\square$, it may cause an unevenness of primary transfer in an obtained visible image.

The surface resistivity is calculated by averaging values of 12 points (3 points equally spaced in width direction and 4 points in longitudinal direction) each measured by applying a voltage of 500 V for 10 seconds in the environment of room temperature and room humidity (temperature: 20±1° C., relative humidity: 50±2%) by means of the resistivity measuring instrument (Hiresta IP, manufactured by Yuka Electronic Co.).

The thickness of the intermediate transfer belt of the present invention is preferable 40-300 μm, more preferable 45-200 μm.

[Conductive Filler]

Well-known various kinds of conductive fillers may be employable as the conductive filler for the intermediate transfer belt of the present invention. Specific example of conductive filler includes; powder and short fibers of carbon black; carbon nanotube; powder obtained by pulverizing graphite; short fibers of titanate; metal oxide powder such as Sb-doped tin oxide, In-doped tin oxide and zinc oxide; powder of electronically conductive polymer such as polyaniline, polypyrrole and polyacetylene; and so on. Specific examples of carbon black include acetylene black, Ketchen black, acidic carbon and the like.

The conductive filler may be a substance which can be dissolved in polyamic acid solution or a substance which is dispersed in said solution without being dissolved. The conductive filler is preferably a substance which is dispersed in polyamic acid solution.

A content of the conductive filler in the intermediate transfer belt is preferable 1 to 35% by mass based on polyimide, more preferable 3 to 15% by mass.

In the case of a content of the conductive filler in the intermediate transfer belt being in the above range, the intermediate transfer belt can have the predetermined surface resistivity. On the contrary, in the case of a content of the conductive filler in the intermediate transfer belt being excessively low, it may cause excessive high surface resistivity. Further, in the case of a content of the conductive filler in the intermediate transfer belt being excessively high, it may cause excessive low surface resistivity.

The polyimide for the intermediate transfer belt of the present invention contains a unit structure represented by Formula (1).

In Formula (1), X represents a group of Formulas (a) to (e), n, m, l each represents 0 or 1, and at least one of m and l is 1.

Further, p in Formula (c) and q in Formula (e) each is an integer of 1 to 5.

In the intermediate transfer belt of the present invention, mol ratio of imide bond to hydroxyl group is preferable from 2.00:0.10 to 1.70:2:00.

In the case of a content ratio of hydroxyl group to imide-bond in the intermediate transfer belt being in the range described above, since a residual charge is reliably lowered due to carrying current adequately, whereby the intermediate transfer belt can keep a surface resistivity in the predetermined range with long-term use. On the contrary, in case of a content ratio of hydroxyl group to imide-bond being excessively low, a residual charge becomes high and the intermediate transfer belt exhibits poor durability. Namely, the intermediate transfer belt may not keep a surface resistivity in the predetermined range with long-term use. In the case of a content ratio of hydroxyl group to imide-bond being excessively high, since a maximum potential becomes excessively high, whereby it may be difficult to keep charge adequately.

Thus, by using an intermediate transfer belt comprising polyimide having hydroxyl group, since a residual charge is lowered to inhibit a change of the surface resistivity by applying voltage, whereby fine toner dots in white area can be inhibited in an environment of low temperature and low humidity and further inhibited roughness of image with long-term use.

[Preparation of Intermediate Transfer Belt]

The intermediate transfer belt of the present invention can be prepared by following steps: synthesizing polyamic acid which is an intermediate of a polyimide by employing tetracarboxylic acid and at least diamine having hydroxyl group, followed by imidizing the polyamic acid to obtain polyimide. Specific example of a method for producing the intermediate transfer belt according to the present invention include steps of: (1) synthesizing polyamic acid by employing tetracarboxylic acid and at least diamine having hydroxyl group, (2) preparing an endless belt precursor by using polyamic acid dope in which conductive filler is added into polyamic acid, (3) imidizing reaction in which the endless belt precursor is heated to the belt comprising polyimide. (1) Synthesis step of Polyamic acid Synthesis step of polyamic acid is a step in which a polycondensation of a tetracarboxylic acid component and a diamine component at least containing a diamine having hydroxyl group can be performed and polyamic acid is synthesized. Specifically, the polycondensation is performed in a good solvent for the polyamic acid to obtain a polyamic acid solution in which the polyamic acid is dissolved.

The good solvent for the polyamic acid is a solvent in which the polyamic acid can uniformly be dissolved in a concentration of 20% by mass or more at 25° C. Examples of such a good solvent include an organic polar solvent selected from the group consisting of amides such as N,N-dimethylacetamide, N,N-diethylacetamide, N,N-dimethylformamide N,N-diethylformamide N-methyl-2-pyrrolidone and hexamethylsulforamide; sulfoxides such as dimethyl sulfoxide and diethyl sulfoxide; sulfones such as dimethyl sulfone and diethyl sulfone. These solvents may be used alone or in combination. N-methylpyrrolidone is preferably used.

Amount of used solvent may be preferably determined so that the concentration of polyamic acid in the resulting polyamic acid solution after polycondensation is in the range of 2-50% by mass.

A method for polycondensation of the tetracarboxylic acid component and the diamine component may be carried out by publicly known methods. Specifically, for example, when the tetracarboxylic acid component and the diamine component are used in almost equimolar amounts, and the polycondensation is performed for 0.1 to 60 hours at a temperature of 100° C. or less, preferably 0 to 80° C.

[Diamine having Hydroxyl Group]

Diamine having hydroxyl group is represented by Formula (2). In Formula (2), X represents a group selected from Formulas (a) to (e), n, m, l each represents 0 or 1, and at least one of m and l is 1.

Further, p in Formula (c) and q in Formula (e) each is an integer of 1 to 5.

Specific examples of diamine having hydroxyl group include a compound represented Formulas (A) to (C).

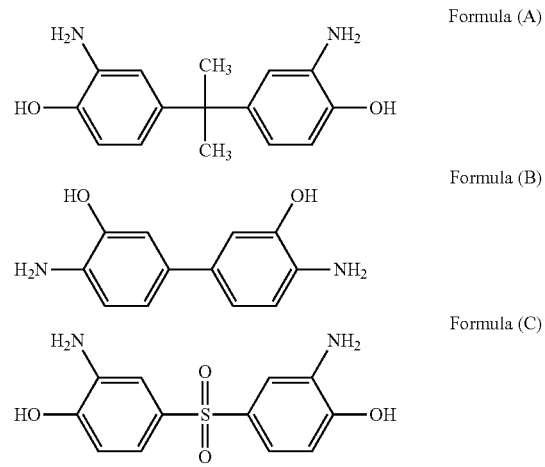

In synthesis of polyamic acid according to the present invention, an aromatic diamine without having hydroxyl group may be used in combination with the diamine having hydroxyl group.

Examples of the aromatic diamine without having hydroxyl group component include; diaminodiphenyl ether compounds such as 4,4'-diaminodiphenyl ether (which is often abbreviated to "DADE", hereafter); diaminodiphenylalkane compounds such as 4,4'-diaminodiphenylmethane, 4,4'-diaminodiphenylpmpane, 3,3'-diaminodiphenylmethane and 3,3'-diaminodiphenylpropane; benzidine compounds such as benzidine and 3,3'-dimethylbenzidine; diaminodiphenyl sulfide compounds such as 4,4'-diaminodiphenyl sulfide and 3,3'-diaminodiphenyl sulfide; diaminodiphenyl sulfone compounds such as 4,4'-diaminodiphenyl sulfone and 3,3'-diaminodiphenyl sulfone; and diaminobenzene compounds such as metha-phenylenediamine and para-phenylenediamine (PPD). Of these, preferable are diaminodiphenyl ether compounds and diaminodiphenylalkane compounds.

In the case of combination with the aromatic diamine without having hydroxyl group, content of the diamine having hydroxyl group is preferable not less than 10 mol % based on 100 mol % of the sum of the aromatic diamine without having hydroxyl group and the diamine having hydroxyl group, more preferable not less than 35 mol %.

When the content of the diamine having hydroxyl group is in the above described range, the intermediate transfer belt can be prepared which can keep a surface resistivity in the predetermined range with long-term use.

[Tetracarboxylic Acid]

Examples of the aromatic tetracarboxylic acid component for synthesizing the polyamic acid according to the present invention are not specifically limited but include an aliphatic tetracarboxylic acid, an aromatic tetracarboxylic acid; anhydrides, salts and esterified compounds thereof; and mixtures of these. In particular, the dianhydride of aromatic tetracarboxylic acid is preferably used.

Specific examples of the aliphatic tetracarboxylic acid include butane tetracarboxylic acid.

Specific examples of the aromatic tetracarboxylic acid include; biphenyltetracarboxylic acid compounds such as 3,3',4,4'-biphenyltetracarboxylic acid, 2,2',3,3'-biphenyltetracarboxylic acid and 2,3,3',4'-biphenyltetracarboxylic acid; benzophenonetetracarboxylic acid compounds such as 3,3', 4,4'-benzophenonetetracarboxylic acid; diphenylalkanetetracarboxylic acid compounds such as bis(3,4-dicalboxyphenyl)methane and 2,2-bis(3,4-dicalboxyphenyl)propane; diphenyl ether tetracarboxylic acid compounds such as bis(3,4-dicarboxyphenyl)ether and bis(3,4-dicarboxyphenyl)thioether; diphenylsulfone tetracarboxylic acid compounds such as bis (3,4-dicarboxyphenyl)sulfone; naphthalenetetracarboxylic acid compounds such as 2,3,6,7-naphthalene tetracarboxylic acid; tetracarboxybenzene compounds such as pyromellitic acid and so on.

Examples of a component for forming salts with the tetracarboxylic acid include ammonia, organic monoamine, organic diamine, organic triamine and organic tetraamine, and, in particular, the aromatic diamine described below is preferably used.

Examples of a component for forming esterified compounds with the tetracarboxylic acid include monovalent alcohol, bivalent alcohol and trivalent alcohol.

Examples of a preferable component among the tetracarboxylic acid component include dianhydrides and esterified compounds of biphenyltetracarboxylic acid compounds and tetracarboxybenzene compounds and, in particular, dianhydrides of tetracarboxybenzene compounds are preferably used.

A content of the aromatic tetracarboxylic acid component is preferable not less than 80 mol % based on the total tetracarboxylic acid. As a content of the tetracarboxylic acid, the tetracarboxylic acid to the diamine (a sum of the diamine having a hydroxyl group and the aromatic diamine without having hydroxyl group) is in the range of 0.85:1.00 to 1.20: 1.00 by mol ratio.

A number-average molecular weight of the polyamic acid is preferable not less than 1,000, more preferable 2,000 to 500,000, still more preferable 5,000 to 150,000.

The number-average molecular weight of the polyamic acid is measured by using a GPC. Specifically, the molecular weight determination via the GPC is carried out as described below. Using an apparatus of HLC-8220 (manufactured by Tosoh Corp.) and a triple column of TSKguardcolumn+TSKgelSuperHZM-M 3 series (manufactured by Tosoh Corp.), tetrahydrofuran (THF) as a carrier solvent is poured at a flow rate of 0.2 ml/min, while holding the column temperature at 40° C. The measurement samples are dissolved in tetrahydrofuran to a density of 1 mg/ml at a condition of dissolving the measurement samples at room temperature over five minutes using an ultrasonic homogenizer. Subsequently, the resulting solution is forced through membrane filters of a pore size of 0.2 μm to obtain a sample solution followed by injection of 10 μl of the sample solution into the apparatus together with the above carrier solvent, and then, detection is carried out using a refractive index detector (RI detector). The molecular weight distribution of the measurement sample is calculated using a calibration curve measured using a calibration curve measured using monodispersed polystyrene standard particles. As the standard polystyrene particles for the determination of the calibration curve, the particles manufactured by Pressure Chemicals Co. having a molecular weight of $6\times10^2$, $2.1\times10^3$, $4\times10^3$, $1.75\times10^4$, $5.1\times10^4$, $1.1\times10^5$, $3.9\times10^5$, $8.6\times10^5$, $2\times10^6$, and $4.48\times10^6$ are used, and at least about ten standard polystyrene samples are measured to prepare a calibration curve. As a detector, a refractive index detector is used.

(2) Preparation Step of Endless Belt Precursor

The preparation step of an endless belt precursor is a step in which the endless belt precursor is prepared via a sheet shaped precursor prepared from the polyamic acid, for example, by a casting method or an extrusion molding method and followed by forming a loop, or prepared via directly molded to a loop form.

<Preparation Step of Sheet Shaped Precursor by Casting Method>

In a casting method, a sheet shaped precursor can be obtained by flow-casting the polyamic acid dope solution obtained by the above-mentioned synthesis of polyamic acid on a substrate or by pour-casting it into a mold to evaporate a solvent.

The polyamic acid dope solution used in the casting method is prepared as follows: Into the polyamic acid solution obtained by the above-mentioned synthesis of polyamic acid, conductive filler is dissolved or dispersed, and if appropriate, additives such as a conductive agent, a surfactant, a viscosity controlling agent, and a plasticizer and further a solvent for dilution are added to adjust a concentration and a viscosity.

An amount of the total solvent in the polyamic acid solution is preferably within the range of 20 to 90% by mass, more preferably 40 to 70% by mass.

A viscosity of the polyamic acid solution is not particularly limited as long as the sheet shaped precursor having the predetermined thickness can be obtained, and the viscosity may be, for example, 10 cp to 10,000 cp.

As a solvent for dilution, the solvent of the polyamic acid described above or a poor solvent for the polyamic acid described below may be employable. The poor solvent is a solvent in which the maximum concentration of the polyamic is less than 2% by mass, particularly less than 1% by mass at 25° C. Examples of such a poor solvent include water; alcohols such as methanol, ethanol, isopropanol and the like; ethylene glycol; quinoline; isoquinoline; No. 0 Solvent; 1-decanol and the like. No. 0 Solvent is a n-paraffinic solvent which is obtained by purifying a kerosine fraction. These solvents may be used alone or in combination.

In particular, from the view point of accelerating a speed of film-formation speed and enhancing a production efficiency, the solution of the polyamic acid used in the casting method preferably comprises the poor solvent. It is preferable to use the poor solvent which is compatible with the good solvent for the polyamic acid. It is more preferable to use the poor solvent having a boiling point which is higher than that of the good solvent for the polyamic acid. Concretely, the poor solvent having a boiling point or a heat decomposition point of 150 to 500° C., preferably 170 to 300° C. is used. An adding amount of the poor solvent is preferably within the range of 0.01 to 40% by mass, more preferably 0.1 to 20% by mass relative to an amount of the good solvent in the solution of the polyamic acid.

As the additives such as the surfactant and the viscosity modifier, the substances described in the following literatures can be used: Latest Polyimide—base and application—(edited by Japanese Society for Study of Polyimide (NTS Publisher)); Latest Polyimide Materials and Applied Technology (supervised by Masaaki Kakimoto; CMC Publisher).

When the conductive filler which is not dissolved in the dope solution of the polyimamic acid and/or additives are added to said solution, a means for achieving a uniform dispersion is preferably applied to the dope solution of the polyamic acid. For example, publicly known mixers such as stirring blades, static mixer, single-screw kneader, double-screw kneader, homogenizer, ultrasonic dispersion machine and the like are preferably used for mixing and dispersing said additives into said solution.

When a sheet is formed from the solution in the casting method, a film-forming means such as bar coater, doctor blade, slide hopper, spray coat, T-die extruder and the like may be used.

A drying method for evaporating the solvent in the casting method is not particularly limited, and, for example, a method for heating the substrate on which the solution is casted or the mold in which the solution is poured can be used. In this drying method, a heating member having a roll shape or a board shape or a wind, which is heated to the same temperature as that of the substrate and mold, may be used in order to accelerate the evaporation of the solvent.

A drying temperature is not particularly limited as long as said temperature is lower than a starting temperature of imidizing reaction mentioned below, and the solvent can be evaporated at said temperature. For example, the drying temperature is within the range of from 40 to 280° C., in particular 80 to 260° C., preferably 120 to 240° C., more preferably 120 to 220° C.

In the casting method, the drying process may be performed until the content of the solvent contained in the dried sheet shaped precursor becomes a value within the suitable range for the endless belt precursor.

A thickness of the sheet shaped precursor made is not particularly limited, and is normally 5 μm to 500 μm, preferably 10 μm to 300 μm. A method for forming an endless belt precursor from a sheet shaped precursor is not particularly limited, and various well-known methods can be employable.

<Preparation step of Sheet shaped precursor by Extrusion Molding Method> An extrusion molding method is a method in which the solution of the polyamic acid obtained by the polymerization step mentioned above is dried to form a gel, and the polyamic acid gel is extruded from a T-die onto the substrate to evaporate a solvent, resulting in forming the sheet shaped precursor. The polyamic acid gel used to an extrusion molding method can be obtained by preparing the polyamic acid dope solution in the same manner as the casting method described above, followed by drying the polyamic acid dope solution to evaporate a solvent.

A content of the solvent in the polyamic acid gel is within the range of from 8 to 20% by mass, preferably 8 to 10% by mass relative to the total mass of the gel.

A drying process for forming the polyamic acid gel is performed by evaporating the solvent from the solution of the polyamic acid. Examples of a drying method include: a method in which the solution of the polyamic acid dope solution is casted or applied to a heated drum made of metal to evaporate the solvent, and a method in which the solution of the polyamic acid dope solution is poured into a container made of metal, and said container is heated in water bath or oil bath to evaporate the solvent. In the case where either of these methods is used, a drying temperature is not particularly limited as long as said temperature is lower than a starting temperature of imidizing reaction mentioned below, and the solvent can be evaporated at said temperature. For example, the drying temperature may be within the same range as that specified in the casting method.

The extrusion molding method is not particularly limited, and, for example, said method may be performed by using a commercially available single or double-screw extruder equipped with a so-called T-die on its discharge port. A temperature of the gel during the extrusion molding is not particularly limited as long as said temperature is lower than the starting temperature of imidizing reaction mentioned below. The gel temperature may preferably be within the range of from 10 to 100° C., particularly a room temperature from the view point of a production cost.

When a sheet is formed from the polyamic acid gel on the support by the extrusion molding method, a film-forming means such as extrusion coater, roll coater and the like may be used.

A drying method for evaporating the solvent in the extrusion molding method is not particularly limited and, for example, a method of heating the substrate on which the gel is extruded can be used. In this drying method, a heating member having a roll shape or a board shape or a wind, which is heated to the same temperature as that of the substrate, may be used in order to accelerate the evaporation of the solvent.

A drying temperature is not particularly limited as long as said temperature is lower than the starting temperature of imidizing reaction mentioned below, and the solvent can be evaporated at said temperature. For example, the drying temperature may be within the same range as that used in the casting method.

In the extrusion molding method, the drying process may be performed until the content of the solvent contained in the dried sheet shaped precursor becomes a value within the suitable range for the endless belt precursor.

A thickness of the sheet shaped precursor made is not particularly limited, and is normally 5 μm to 500 μm, preferably 10 μm to 300 μm.

A method for forming an endless belt precursor from a sheet shaped precursor is not particularly limited, and various well-known methods can be employable.

<Preparation Step of Directly Molding Endless Belt Precursor>

The polyamic acid dope solution prepared via synthesizing step of the polyamic acid is applied on outer surface of a metal mold. As the metal mold, a cylindrical metal mold is preferable, and instead of the metal mold, molding dies made of various conventionally known materials such as resins, glass, ceramic may be preferably used as the molding die. Further, provision of a glass coat or ceramic coat on the surface of a molding die, and use of a silicone or fluorine-based releasing agent may also be selected. Further, a film thickness controlling metal mold having regulated clearance for a cylindrical metal mold is inserted in the cylindrical metal mold and moved in parallel to exclude an excess solution to eliminate irregularity in thickness of a solution on the cylindrical metal mold. If the thickness of a solution has been controlled in a stage of application of a solution on the cylindrical metal mold, there is particularly no need for use of the film thickness controlling metal mold.

Next, this cylindrical metal mold carrying thereon an applied polyamic acid solution is placed under a heating, and dried for volatilization of 20% by mass or more, desirably 60% by mass or more of the content solvent. In this step, solvent may remain in the layer as long as the surface of the layer becomes dried and the layer does not flow in case of inclining the cylindrical metal mold. A drying temperature is not particularly limited as long as said temperature is lower than the starting temperature of imidizing reaction mentioned below, and the solvent can be evaporated at said temperature. For example, the drying temperature may be within the same range as that used in the casting method.

(3) Imidizing Reaction Step

The imidizing reaction step is a step in which the imidizing reaction from polyamic acid is achieved by heating and keeping the endless belt precursor to the prescribed temperature for the predetermined time, whereby an immediate transfer belt made of polyimide is prepared.

Said temperature is a starting temperature of imidizing reaction and is normally within the range of 280° C. or more, in particular 280 to 400° C., preferably 300 to 380° C., more preferably 330 to 380° C. The reaction time is normally within the range of 10 minutes or more, preferably 30 to 240 minutes.

In the preparation method of an intermediate transfer belt made of polyimide produced by using the above-mentioned method, the polyamic acid having hydroxyl group can be obtained by employing the diamine having hydroxyl group. When conductive filler is further added to the polyamic acid and followed by imidization, the intermediate transfer belt in which the conductive filler is highly dispersed in the polyimide can be prepared. As a result, the intermediate transfer belt can keep a surface resistivity in the predetermined range with long-term use.

[Image Forming Apparatus]

The intermediate transfer belt of the present invention is installed in, for example, an intermediate transferring type image forming apparatus.

The image forming apparatus, serving as an image forming apparatus for forming a color image, employs the intermediate transferring method, so to speak, which includes the steps of: forming each of a plurality of toner images having different color onto each of a plurality of image bearing members; sequentially transferring each of the unicolor toner images onto a common intermediate transfer belt so as to overlap the unicolor toner images with each other on the intermediate transfer belt and then, transferring the full color toner image, formed on the intermediate transfer belt, onto a transfer material P at a time as a transferring operation.

FIG. 1 shows an explanatory schematic diagram of the first embodiment of the image forming apparatus embodied in the present invention.

The image forming apparatus is provided with an intermediate transfer belt 17, which is made of an endless type belt and is circularly moved in a direction indicated by an arrow shown in FIG. 1. In an arranging area of toner image forming units disposed at the outer circumferential region of the intermediate transfer belt 17, four toner image forming units 30Y, 30M, 30C, 30K, for forming a yellow toner image, a magenta toner image, a cyan toner image, a black toner image, respectively, are disposed in such a manner that these are arrayed along the moving direction of the intermediate transfer belt 17 while sequentially separating from each other. The intermediate transfer belt 17 is threaded on various kinds of rollers including a conductive opposing roller 17a detailed later (hereinafter, referred to as an "opposing roller", for simplicity), 17b, 17c and 17d, so that the intermediate transfer belt 17 is circularly moved while being contacted image bearing members 10Y, 10M, 10C, 10K by pushing actions of primary transferring devices 14Y, 14M, 14C, 14K in the toner image forming units 30Y, 30M, 30C, 30K, respectively.

The toner image forming units 30Y for forming a toner image of yellow color is provided with an image bearing member 10Y being a photoreceptor drum to be rotated. In the peripheral space along the circumferential surface of the image bearing member 10Y, a charging device 11Y, an exposing device 12Y and a developing device 13Y for developing a yellow toner image by using developing agent for yellow color image are arranged in a rotating direction of the image bearing member 10Y according to this order. Further, a cleaning device 18Y having a cleaning blade for cleaning the image bearing member is disposed at a downstream side of a primary transferring device 14Y, which is disposed at a downstream position of the developing device 13Y in the rotating direction of image bearing member 10Y.

For instance, the image bearing member 10Y is provided with a photosensitive layer, which is coated on a drum-shaped metal base member and is made of a resin material containing an organic photoconductive material. In FIG. 1, the image bearing member is arranged in such a manner that the longitudinal direction of the photoreceptor drum is extended in a direction perpendicular to the paper surface.

The charging device 11Y includes, for instance, a scorotron charger having a grid electrode and a discharging electrode, while the exposing device 12Y includes, for instance, a laser beam irradiating device.

The developing device 13Y includes a developing sleeve, which rotates and which incorporates a magnet to retain developing agent while rotating, and a voltage applying device (not shown in the drawings) for applying a DC bias voltage and/or an AC bias voltage to a gap between the image bearing member 10Y and the developing sleeve.

The primary transferring device 14Y is constituted by a primary transferring roller 141Y that is provided so as to form a primary transferring region in a state of press-contacting the surface of the image bearing member 10Y while putting the intermediate transfer belt 17 between them, and a transfer-current supplying device (not shown in the drawings) including, for instance, a constant current source coupled to the primary transferring roller 141Y. The yellow toner image, residing on the image bearing member 10Y, is electrostatically transferred onto the intermediate transfer belt 17 by supplying a primary transferring current outputted from the transfer-current supplying device to the primary transferring roller 141Y. The abovementioned method is called as the contact-transferring method.

The cleaning blade for cleaning the image bearing member, provided in the cleaning device 18Y, is made of an elastic material, such as, for instance, a polyurethane rubber, etc. The base portion of the cleaning blade is supported by a supporting member, while the leading edge portion of the cleaning blade contacts the surface of the image bearing member 10Y. Further, the cleaning blade is extended from the base portion in a counter direction, opposite to the rotating direction of the image bearing member 10Y at the contacting point.

Each configuration of the toner image forming units 30M, 30C, 30K is the same as that of the toner image forming units 30Y for forming a toner image of yellow color Y, except that the developing agent includes each of magenta toner, cyan toner and black toner, instead of yellow toner.

A secondary transferring device 14S is disposed at a position downstream from the toner image forming unit 30K for forming a toner image of black color. The secondary transferring device 14S is constituted by a secondary transferring roller 141S that is provided so as to form a transferring region in a state of press-contacting the backup roller 17d while putting the intermediate transfer belt 17 between them, and a transfer-current supplying device (not shown in the drawings) coupled to the secondary transferring roller 141S. The full color toner image, formed on the intermediate transfer belt 17, is transferred onto a conveyed transfer material P by supplying a transferring current outputted from the transfer-current supplying device to the secondary transferring roller 141S. The above-mentioned method is called as the contact-transferring method.

A cleaning device 18S is disposed at a position downstream from the secondary transferring device 14S which removes a residual toner on the intermediate transfer belt 17.

In the image forming apparatus, the image forming operations are conducted as follow. In each of the toner image forming units 30Y, 30M, 30C, 30K, each of the image bearing member 10Y, 10M, 10C, 10K is driven to rotate. Each of the image bearing members 10Y, 10M, 10C, 10K is charged at a predetermined polarity, for instance, a negative polarity, by the charging device 11Y, 11M, 11C, 11K. Next, on an image forming area of the surface of each image bearing member on which a toner image is to be formed, an electronic potential of an irradiated portion (an exposed region) is lowered by an exposing action performed by each of the exposing device 12Y, 12M, 12C, 12K so as to form an electrostatic latent image corresponding to the original image on each of image bearing members 10Y, 10M, 10C, 10K. Then, in each of the developing devices 13Y, 13M, 13C, 13K, the reverse developing operation is performed in such a manner that toner charged at, for instance, a negative polarity, namely, the same as that of the surface potential of each of the image bearing members 10Y, 10M, 10C, 10K, are attached to the electrostatic latent image formed on each of the image bearing members 10Y, 10M, 10C, 10K, to form a unicolor toner image corresponding to each of colors Y, M, C, K.

Further, each of the unicolor toner images is sequentially transferred onto the primary transferring area on the intermediate transfer belt 17 by each of the primary transferring device 14Y, 14M, 14C, 14K, so that the unicolor toner images of colors Y, M, C, K overlap with each other to form a full color image on the intermediate transfer belt 17.

In each of the toner image forming units 30Y, 30M, 30C, 30K, residual toner, remaining on each of the image bearing members 10Y, 10M, 10C, 10K after passing through the primary transferring region, are removed by the image bearing member cleaning blade equipped in each of the cleaning devices 18Y, 18M, 18C, 18K.

Toner left on the intermediate transfer belt 17 after passing through the secondary transfer region are removed by the cleaning device 18S.

[Developer]

The developer of the present invention may be used as a magnetic or a nonmagnetic one component developer, and also may be used as a two component developer by being mixed with toner and carrier.

As a toner constituting a developer utilized in an image forming apparatus of the present invention, various types well known in the art can be utilized without specific limitation; however, for example, a so-called polymerized toner having a volume average median diameter of 3-9 μm prepared by a polymerization method is preferably utilized. By utilizing a polymerized toner, it is possible to obtain high resolution and stable image density with respect to a formed visual image as well as to sufficiently restrain generation of fog.

Further, as a carrier constituting a two-component developer utilized in an image forming apparatus of the present invention, various types well known in the art can be utilized without specific limitation; however, for example, a ferrite carrier comprising magnetic particles having a volume average median diameter of 30-65 μm and a magnetization of 20-70 emu/g is preferably utilized. In the case of utilizing a carrier having a volume average median diameter of less than 30 μm, there is a fear of causing carrier adhesion to generate a white spotted image, while in the case of utilizing a carrier having a volume average median diameter over 65 μm, there may be a case not to form an image having uniform image density.

[Image Support]

The image support employed in the image forming method includes a various kinds of supports such as a regular paper including a thin paper and a thick paper, a high-quality paper, a coated printing paper such as an art paper and a coated paper, a commercially available Japanese paper or post card, a plastic film used for OHP, and a cloth, without being limited thereto.

As mentioned above, the embodiment of the present invention has been described. However, the present invention is not limited to the abovementioned embodiment and may be applied with various modifications.

EXAMPLES

Hereafter, although concrete examples of the present invention are described, the present invention is not limited to these examples.

Example 1

Equivalent amounts of pyromellitic dianhydride and diamine (B) having hydroxyl group represented by Formula (B) were subjected to a condensation polymerization reaction in N-methylpyrrolidone (NMP) at ordinary temperature (20° C.) to obtain a solution of polyamic acid [A] (a solid content concentration: 18% by mass). A part of the solution [A] (200 g) was taken out, 2 g of a No. 0 Solvent (made by JX Nippon Oil & Energy Corporation) and 5.4 g of carbon black "Printex U" (made by DEGUSSA) were added to the solution, and the mixture was sufficiently agitated to obtain a polyamic acid dope solution [A]. A solvent content in the polyamic acid dope solution [A] was 82.1% by mass. A sheet was continuously produced from the polyamic acid dope solution [A] by means of a flow casting method. More specifically, while a drum made of metal having a width of 440 mm and a diameter of 400 mm, which was heated to 140° C., was rotated, the polyamic acid dope solution [A] was casted and coated on the outer peripheral surface of the drum by using an extrusion coater in order to dry the coated film. Then, a peeling of the dried film was performed to obtain a sheet made of polyamic acid (A) having a width of 400 mm, a length of 1210 mm and a thickness of 120 μm.

A number average molecular weight of the polyamic acid forming the sheet [A] was 110,000.

A sheet having a width of 320 mm and a length of 970 mm was cut out from the sheet [A], and the both ends of the obtained sheet were overlapped. After that, an imidizing reaction was performed by rising the temperature at a speed of 5° C./min from the room temperature to 350° C., and maintaining the temperature of 350° C. for 1 hour to obtain an intermediate transfer belt [1].

Surface resistivity of the intermediate transfer belt [1] was $1.54 \times 10^{12} \Omega/\square$.

Examples 2 to 4 and Comparative Examples 1 to 3

Intermediate transfer belts [2] to [7] each was prepared in the same manner as Example 1, except for employing diamine having hydroxyl group and/or other diamine at a ratio listed in Table 1 provided that sum of amines was one equivalent amount, instead of employing 1 mol of diamine (B) having hydroxyl group.

(1) Evaluation of Generation of Fine Toner Dots in White Area

With respect to each Intermediate transfer belts [1] to [7], generation of fine toner dots in white area was evaluated as follows.

Intermediate transfer belts [1] to [7] each was installed in an image forming apparatus "bishub PRO C6500" (made by Konica Minolta Business Technologies Inc.). Printing test was carried out in which dot image having a dot size of 3 mm by magnification of 100 fold was repeatedly formed. Arbitarily selected 100 dots are photographed by a scanning electron microscope and evaluated by an image processing analyzer (LUZEX IID, produced by Nireco Co.). At maximum 2% of an area ratio of dot image to flame area, circle equivalent diameter of each dot and circumference length of each dot image were determined. According to the following Expression (X), a circularity was calculated and averaged. An average circularity was used for evaluating a generation of fine toner dots in white area.

In the case of the average circularity being not less than 0.950, the generation of fine toner dots in white area can be inhibited and judged to be practically non-problematic. On the contrary, in the case of the average circularity being less than 0.950, the generation of fine toner dots in white area can be judged to be practically problematic.

Average circularity=(Circle equivalent diameter)/(circumference length of dot image). Expression (X):

(2) Evaluation of Durability

Evaluation of durability was performed for each Intermediate transfer belts [1] to [7].

Specifically, a high voltage applying test was performed by using current system by which a change of surface resistivity was determined after applying voltage 4.0 kV (current about 60 μA) for 50 hours in an environment of temperature 20° C. and relative humidity 55%. Results were listed in Table 1.

When the difference (absolute value) of the surface resistivity between before and after applying high voltage which were represented by common logarithm was not more than 0.5, it can be judged to be maintained enough surface resistivity. On the contrary, in case of the difference of the surface resistivity being more than 0.5, it may cause a roughness of image.

Herein, in Table 1, "under" means a surface resistivity not more than $1.0 \times 10^{8} \Omega/\square$ (under a measurement limit) and "over" means $1.0 \times 10^{13} \Omega/\square$.

TABLE 1

| | Diamine | | | Evaluation Result | | | | | |
| | | | | High voltage apply test | | | | | |
| No. of Intemediate Transfer Belt | Diamine A having hydroxyl group | Other Diamine B | Addition ratio (A:B) | Surface resistivity (Ω/□) | | Surface resistivity (Common logarithm) | | | Fine toner dots in white area |
| | | | | Before | After | Before | After | Difference (absolute value) | Average Circularity |
|---|---|---|---|---|---|---|---|---|---|
| Inv. 1 | 1 | (B) | — | 100:0 | $1.54 \times 10^{12}$ | $1.45 \times 10^{12}$ | 12.19 | 12.16 | 0.03 | 0.983 |
| Inv. 2 | 2 | (A) | DADE | 80:20 | $1.86 \times 10^{12}$ | $1.32 \times 10^{12}$ | 12.27 | 12.12 | 0.15 | 0.981 |
| Inv. 3 | 3 | (C) | PPD | 50:50 | $5.72 \times 10^{10}$ | $5.39 \times 10^{10}$ | 10.76 | 10.73 | 0.03 | 0.977 |
| Inv. 4 | 4 | (B) | DADE | 20:80 | $3.32 \times 10^{11}$ | $2.88 \times 10^{11}$ | 11.52 | 11.46 | 0.06 | 0.973 |
| Comp. 1 | 5 | — | PPD | 0:100 | $3.27 \times 10^{8}$ | $2.54 \times 10^{11}$ | 8.52 | 11.41 | 2.89 | 0.933 |
| Comp. 3 | 7 | — | DADE | 0:100 | Over | Under | ≥13 | ≤8 | ≥0.5 | 0.885 |

Inv.: Inventive Example, Comp.: Comparative Example

What is claimed is:

1. An intermediate transfer belt for an electrophotographic image forming apparatus comprising a polyimide having a dispersed conductive fillers wherein the polyimide consists of a unit structure having W and a unit structure having Y represented by Formula (3);

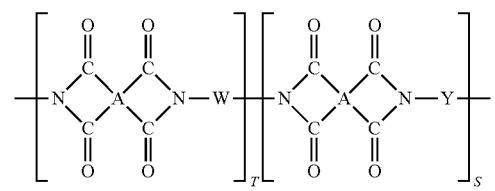

Formula (3)

wherein A represents a group selected from the group consisting of aliphatic group, biphenyl group, benzophenone group, diphenylalkane group, diphenyl ether group, diphenylsulfone group, naphthalene group and phenyl group, W represents a divalent aromatic diamine residue without having hydroxyl group, and Y represents a divalent aromatic diamine residue having hydroxyl group which is represented by Formula (4);

Formula (4)

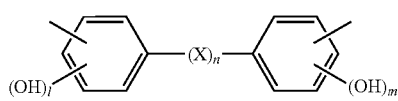

Formula (4)

wherein X represents a group selected from Formulas (a) to (e), n, m, l each represents 0 or 1, and at least one of m and l is 1,

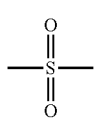

Formula (a)

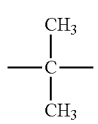

Formula (b)

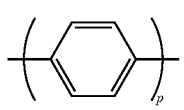

Formula (c)

Formula (d)

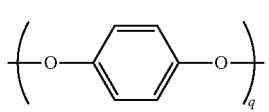

Formula (e)

wherein p in Formula (c) and q in Formula (e) each is an integer of 1 to 5; and r is in the range of 0 to 90 mol % and s is in the range of 10 to 100 mol % and r+s=100 mol %.

2. The intermediate transfer belt of claim 1 comprising the polyimamic acid made of a tetracarboxylic acid, a diamine having a hydroxyl group represented by Formula (2) and an aromatic diamine without having hydroxyl group,

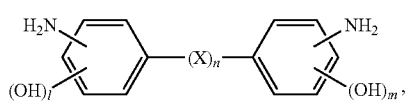

Formula (2)

wherein X represents a group selected from Formulas (a) to (e), n, m, l each represents 0 or 1, and at least one of m and l is 1,

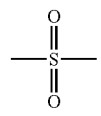

Formula (a)

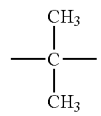

Formula (b)

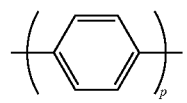

Formula (c)

Formula (d)

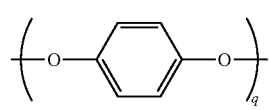

Formula (e)

wherein p in Formula (c) and q in Formula (e) each is an integer of 1 to 5; and wherein a mol ratio of the tetracarboxylic acid to a sum of the diamine having a hydroxyl group represented by Formula (2) and the aromatic diamine without having hydroxyl group is in the range of 0.85:1.00 to 1.20:1.00; and further a mol ratio of the diamine having hydroxyl group to the aromatic diamine without having hydroxyl group in the total diamine is in the range of from 0.10:0.90 to 1.00: 0.00.

3. A method for producing the intermediate transfer belt of claim 1, comprising steps of synthesizing a polyamic acid by using at least a tetracarboxylic acid and a diamine having a hydroxyl group represented by Formula (2), forming a belt shaped precursor of the polyamic acid and converting the polyamic acid to the polyimide;

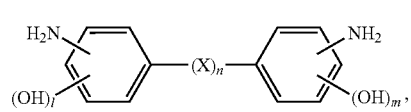

Formula (2)

wherein X represents a group selected from Formulas (a) (e), n, m, l each represents 0 or 1, and at least one of m and l is 1,

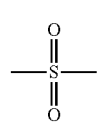

Formula (a)

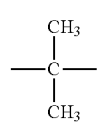

Formula (b)

-continued

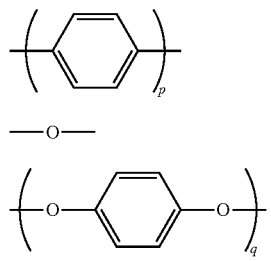

Formula (c)

—O—  Formula (d)

Formula (e)

wherein p in Formula (c and q in Formula (e) each is an integer of 1 to 5.

4. The method for producing the intermediate transfer belt of claim 3, wherein the polyamic acid is synthesized by using the tetracarboxylic acid, the diamine having a hydroxyl group represented by Formula (2), and an aromatic diamine without having hydroxyl group and
wherein a mol ratio of the tetracarboxylic acid to a sum of the diamine having a hydroxyl group represented by Formula (2) and the aromatic diamine without, having hydroxyl group is in the range of 0.85:1.00 to 1.20:1.00; and further
a mol ratio of the diamine having hydroxyl group to the aromatic diamine without having hydroxyl group in the total diamine is in the range of from 0.10:0.90 to 1.00:0.0.

5. The intermediate transfer belt of claim 1, wherein A represents biphenyl group or phenyl group.

* * * * *